United States Patent
Jonsson et al.

(10) Patent No.: US 7,164,885 B2
(45) Date of Patent: Jan. 16, 2007

(54) METHOD AND APPARATUS FOR SELECTIVE SERVICE ACCESS

(75) Inventors: Annika Jonsson, Skarpnäck (SE); Ulf Björklund, Sköndal (SE); Fergal Ladley, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1024 days.

(21) Appl. No.: 09/737,950

(22) Filed: Dec. 18, 2000

(65) Prior Publication Data

US 2003/0036350 A1 Feb. 20, 2003

(51) Int. Cl.
*H04Q 7/20* (2006.01)
*H04B 7/00* (2006.01)

(52) U.S. Cl. ............... 455/41.2; 455/456.1; 455/456.2; 455/456.3; 455/466; 455/432.3

(58) Field of Classification Search ............... 455/41.1, 455/42.2, 41.3, 412.1, 412.2, 414.2, 414.3, 455/418, 419, 420, 403, 456.1, 456.2, 456.3, 455/456.5, 456.6, 463–466, 39, 41.2, 515–519, 455/66.1, 66.11
See application file for complete search history.

(56) References Cited

U.S. PATENT DOCUMENTS

| | | | |
|---|---|---|---|
| 6,430,599 B1 * | 8/2002 | Baler et al. ............... | 709/203 |
| 6,532,368 B1 * | 3/2003 | Hild et al. .................. | 455/515 |
| 6,587,866 B1 * | 7/2003 | Modi et al. ................ | 709/105 |
| 6,590,928 B1 * | 7/2003 | Haartsen ..................... | 375/134 |
| 6,633,757 B1 * | 10/2003 | Hwemann et al. .......... | 455/414 |
| 2002/0022453 A1 * | 2/2002 | Ralog et al. ................ | 455/41 |
| 2002/0028690 A1 * | 3/2002 | McKenna et al. .......... | 455/517 |

FOREIGN PATENT DOCUMENTS

WO WO00/69186 A 11/2000

OTHER PUBLICATIONS

"Service Discovery Protocol (SDP)", Specification of the Bluetooth System, Core, Version 1.0.B, Nov. 29, 1999, pp. 324-383, XP002172976.
Guttman, E. et al.: "Automatic Discovery of Thin Servers: SLP, Jini and the SLP-Jini Bridge"; Annual Conference of the IEEE Industrial Electronics Society, US, New York, NY: IEEE, Nov. 29, 1999, pp. 722-727, XP002140937.
Spaker, R.: "Bluetooth Basics" Embedded Systems Programming, Miller Freeman, San Francisco, CA, US, vol. 13, No. 7, Jul. 2000, pp. 57-58, 60, 62, 64, 66, 68, 70, 72, XP000983337.
Haartsen, Jaap: "Bluetooth—The Universal radio interface for ad hoc, wireless connectivity"; Ericsson Review, Telecommunications Technology Journal No. 3, 1998.

* cited by examiner

*Primary Examiner*—William Trost
*Assistant Examiner*—Meless Zewdu
(74) *Attorney, Agent, or Firm*—Potomac Patent Group PLLC (57) ABSTRACT

Methods and techniques for selective service access are described. A short range, wireless device establishes lists of available devices within its transmitting proximity that are able to provide a desired service. The lists can be ranked based upon a service profile, e.g., established by the device user. The lists can also be periodically updated to accommodate device mobility.

21 Claims, 8 Drawing Sheets

Inquiry Response Message Packet (FHS)

| Parity Bits 34 Bits | LAP 24 Bits | Undefined 2 Bits | SR 2 Bits | SP 2 Bits | UAP 8 Bits | NAP 16 Bits | Class Of Devices 24 Bits | AM_ADDR 3 Bits | CLK 26 Bits | Page Scan Mode 3 Bits |

| | | | |
|---|---|---|---|
| T1 | Initiator<br>Device List:<br>Candidate List: | Inquiry → | |
| T2 | Initiator<br><br>Device List: A, B, C | ← Inquiry Response | A<br>B<br>C |
| T3 | Initiator<br><br>Device List: A, B, C<br>Candidate List: A | ← Connect →<br>← SDP → | A<br><br>Bandwidth=x |
| T4 | Initiator<br><br>Device List: A, B, C<br>Candidate List: B, A | ← Connect →<br>← SDP → | B<br><br>Bandwidth=y |
| T5 | Initiator<br><br>Device List: A, B, C<br>Candidate List: B, C, A | ← Connect →<br>← SDP → | C<br><br>Bandwidth=y |

FIG. 8(a)

| | | | |
|---|---|---|---|
| T6 | Initiator<br><br>Device List: A, B, C<br>Candidate List: B, C, A | Connect B<br>←——→ | B |
| T7 | Initiator<br><br>Device List: A, B, C<br>Candidate List: B, C, A | Inquiry<br>——→ | |
| T8 | Initiator<br><br>Device List: A, B, C<br>Candidate List: B, C, A | Inquiry Response<br>←——<br>←—— | A<br>B |
| T9 | Initiator<br><br>Device List: A, C<br>Candidate List: C, A | Connect B<br>←——→<br>Failed | |
| T10 | Initiator<br><br>Device List: A<br>Candidate List: A | Connect C<br>←——→<br>Failed | |
| T11 | Initiator<br><br>Device List: A<br>Candidate List: A | Connect A<br>←——→ | A |

FIG. 8(b)

METHOD AND APPARATUS FOR SELECTIVE SERVICE ACCESS

BACKGROUND

The present invention relates to telecommunications and data communications, and more particularly to a method and apparatus for providing devices, e.g., short-range wireless devices, with selective service access (e.g., Internet service) by selecting from among one or more network devices that offer a desired service.

The radiocommunication industry has made phenomenal strides in commercial operations in the United States as well as the rest of the world. For example, the growth of cellular communication systems in major metropolitan areas has far exceeded expectations and is rapidly outstripping system capacity. If this trend continues, the effects of this industry's growth will soon reach even the smallest markets. At the same time, the commercial success of hand-held information processing devices, e.g., personal digital assistants (PDAs), and the Internet has resulted in a confluence of information and communication technologies that, in turn, is generating new products and a consumer demand for new services.

It is widely anticipated that users of hand-held information processing devices will soon generally expect to receive a wide range of services via a single hand-held device, e.g., telephone services, Internet access and access to any other available information network. An example which is sometimes used in describing the future of these types of devices and services is that of a person moving about in a shopping mall being able to receive and/or query local information networks regarding sales, products, etc. using his or her hand-held device. Wireless technologies offer a mechanism for providing such services. One such technology, commonly referred to as Bluetooth, provides short-range, point-to-point radio access for communication between devices. When a Bluetooth device (referred to herein as the initiator), e.g., a hand-held device, wants to identify other Bluetooth devices that are in the vicinity, e.g., those associated with a number of different shops in the mall, it sends an inquiry message. All Bluetooth devices within range of the initiator that are set in discoverable mode will answer the inquiry. The initiator can then decide whether it wants to connect to any of the discovered devices. If the initiator is searching for other devices because it wants to make use of a specific service (presumably because the user requested that service or because an application running on the user's hand-held device requires that service), the inquiry message can contain a class of device identifier, so that only devices which belong to that class will answer the inquiry. This shall at least increase the possibility that the device that the initiator chooses to connect to can offer the requested service.

Once two Bluetooth devices are connected, the Bluetooth Service Discovery Protocol (SDP) can be used to obtain more detailed information about available services. This protocol is described in more detail below. Briefly, however, the Bluetooth device that wants to use a particular service sends an SDP request, specifying the service that it is seeking. If a peer Bluetooth device can offer the requested service, it sends an SDP reply with an identifier for that service. The SDP requests can also include a list of attributes, in which case the SDP reply contains the values of those attributes for this specific service.

When a Bluetooth device receives several answers to an inquiry, a selection is required to determine the answering device to which a connection should be made. Since the Bluetooth device may be mobile, this selection process is further complicated by that possibility that, even after the initial selection of a device offering the desired service, an even more suitable candidate device may come into range. One way to select among the answering devices is to present all of the answering devices to the user, e.g., on a display of the user's Bluetooth device, and let the user decide which one to connect to. This manual selection process may prove to be time-consuming and annoying, particularly if there are a large number of answering devices that provide the desired service within range of the user's Bluetooth device.

Accordingly, it would be desirable to provide methods and systems for automating the selection of services.

SUMMARY

According to exemplary embodiments of the present invention, these and other drawbacks, limitations and problems associated with conventional service selection techniques are overcome. Exemplary embodiments of the present invention provide an initiator with a service profile which can be compared with the relevant service attributes from responding Bluetooth devices. The initiator can maintain a device list of proximate Bluetooth devices, as well as a candidate list which is ordered based on how well the proximate Bluetooth devices match the service profile. The candidate list can be used to select a servicing device when the service associated with that list is needed, e.g., by an application running on the initiator.

BRIEF DESCRIPTION OF THE DRAWINGS

The objects and advantages of the invention will be understood by reading the following detailed description in conjunction with the drawings, in which.

DETAILED DESCRIPTION

The various features of the invention will now be described with reference to the figures, in which like parts are identified with the same reference characters. In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Conventional networking protocols are based on the characteristics and/or features of fixed networks. In fixed networks, the network configuration typically does not change. Although nodes can be added and removed in fixed networks, the route traveled by data packets between two nodes typically does not change. The disadvantage is that fixed networks cannot be easily reconfigured to account for increases in data traffic, also called system loading. Accordingly, when system loading increases for one node, the surrounding nodes are likely to experience increased delays in the transmission and reception of data. Another drawback to fixed networks is that they are not well-suited to node mobility and, therefore, do not readily support the types of mobile services described above.

In contrast to fixed networks, ad hoc networks are dynamic. An ad hoc network is formed when a number of nodes decide to join together to form a network. Since nodes in ad hoc networks operate as both hosts and routers, ad hoc networks do not require the infrastructure required by fixed networks. Accordingly, ad hoc networking protocols are based upon the assumption that nodes may not always be located at the same physical location. One example of a technology which enables the development of short range, wireless, ad hoc networks is that defined by the recently developed Bluetooth technology which facilitates two-way data transmission. Bluetooth is a universal radio interface in the 2.45 GHz frequency band that enables portable electronic devices to connect and communicate wirelessly via short-range, ad hoc networks. Readers interested in various details regarding the Bluetooth technology are referred to the article entitled "BLUETOOTH—The universal radio interface for ad hoc, wireless connectivity" authored by Jaap Haartsen and found in the Ericsson Review, Telecommunications Technology Journal No. 3, 1998, the disclosure of which is incorporated here by reference. For the purposes of the present invention, only Bluetooth features of immediate interest are described here to avoid obscuring these exemplary embodiments.

To provide some context within which to understand selective service access systems and methods according to the present invention, some exemplary ad hoc network topologies which operate using Bluetooth technology will first be described. Those skilled in the art will, however, appreciate that the present invention can be implemented in other networks than those described here.

Figure 1:
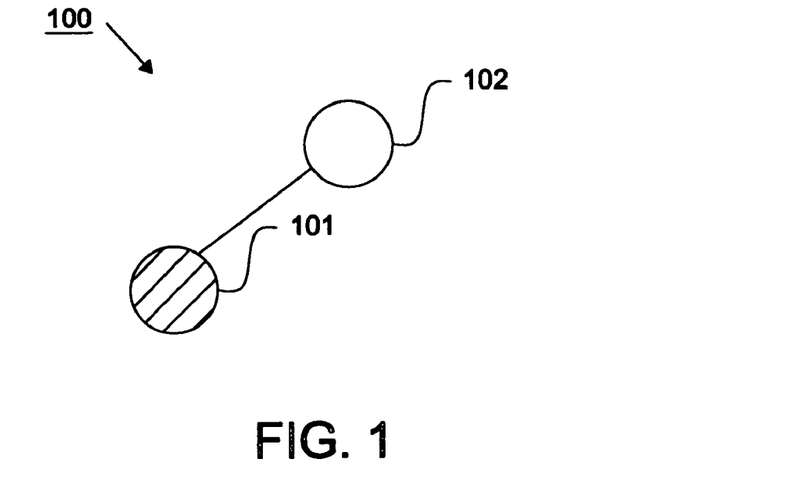
FIG. 1 illustrates a Bluetooth piconet.

FIG. 1 illustrates a Bluetooth piconet. A piconet is a collection of digital devices, such as any of those mentioned above, connected using Bluetooth technology in an ad hoc fashion. A piconet is initially formed with two connected Bluetooth devices. In each piconet, for example piconet 100, there exists one master Bluetooth unit and one or more slave Bluetooth units. In FIG. 1 Bluetooth unit 101 is a master unit and unit 102 is a Bluetooth slave unit.

Figure 2:
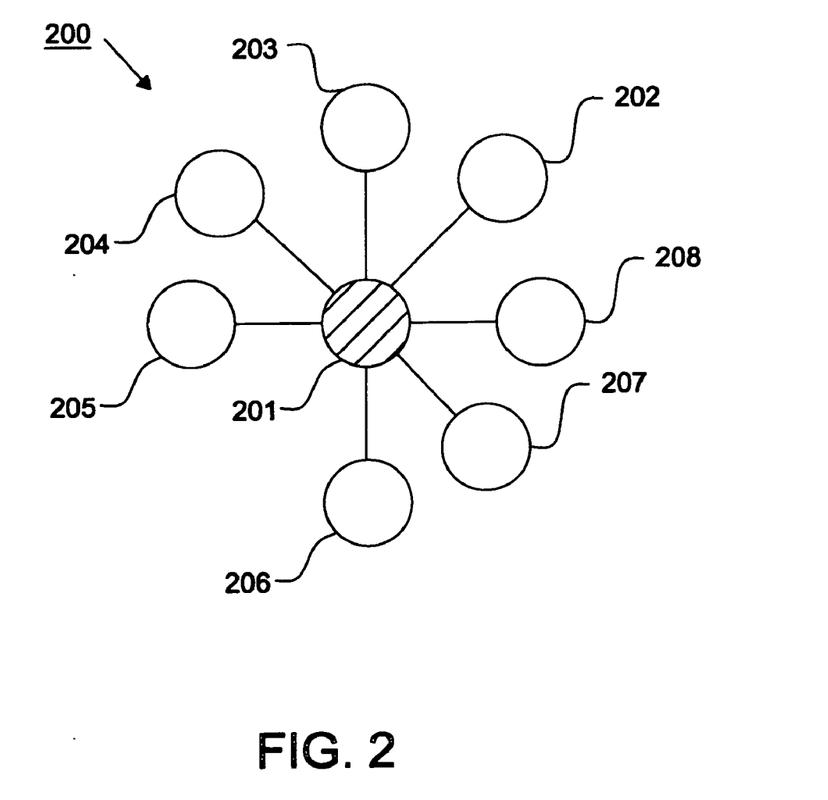
FIG. 2 illustrates a larger piconet, including a master and several slaves.

FIG. 2 illustrates a larger piconet, including a master and several slaves. According to Bluetooth technology a slave unit can only communicate directly with a master unit. FIG. 2 illustrates a piconet 200 with a master unit 201 and a plurality of slave units 202–208 arranged in a star network topology. If slave unit 202 wishes to communicate with slave unit 206, slave unit 202 would transmit the information it wished to communicate to master unit 201. Master unit 201 would then transmit the information to slave unit 206.

Figure 3:
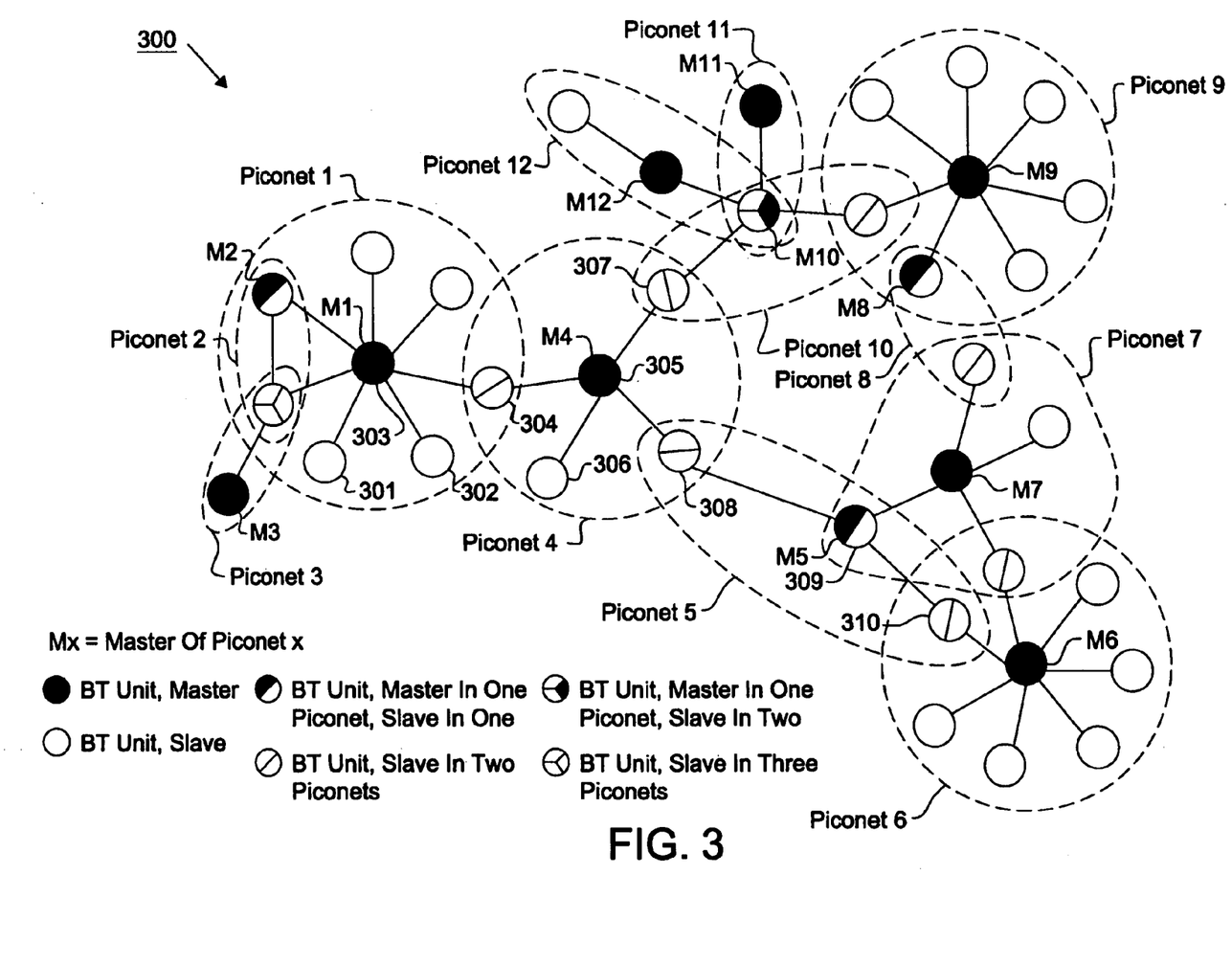
FIG. 3 illustrates an exemplary scatternet.

As those skilled in the art will appreciate, the topologies which develop can become quite complex as the number of devices in the vicinity of one another increases. For example, FIG. 3 illustrates an exemplary scatternet 300. A scatternet is formed by multiple independent and unsynchronized piconets. In FIG. 3, piconet 1 includes the master node 303 and slave nodes 301, 302 and 304; piconet 4 includes the master node 305 and slave nodes 304, 306, 307 and 308; and piconet 5 includes the master node 309 and slave nodes 308 and 310. To implement a scatternet it is necessary to use nodes which are members of more than one piconet. Such nodes are herein referred to as forwarding nodes. If, for example, node 301 wishes to communicate with node 310, then nodes 304 and 308 might act as forwarding nodes by forwarding the information between the two piconets and in particular between nodes 301 and 310. For example, node 301 transfers the information to the master node of piconet 1 node 303. Master node 303 transmits the information to forwarding node 304. Forwarding node 304 then forwards the information to master node 305, which in turn, transmits the information to forwarding node 308. Forwarding node 308 forwards the information to master node 309 which transmits the information to the destination node 310.

A Bluetooth device operating within the above-described topologies can simultaneously be a slave member of multiple piconets, but only master in one piconet. Additionally, a Bluetooth device that acts as master in one piconet can participate in other piconets as a slave. These various roles are reflected in the exemplary topology of FIG. 3 by the different shadings used for different Bluetooth devices, as indicated by the legend. Since typical Bluetooth devices can only transmit and receive data in one piconet at a time, participation in multiple piconets can be provided on a time division multiplex basis.

Each Bluetooth device has a globally unique 48 bit IEEE 802 address. This address, called the Bluetooth Device Address (BD_ADDR) is assigned when the Bluetooth device is manufactured. In addition, the master unit of a piconet assigns a local active member address (AM_ADDR) to each active member of the piconet. The AM_ADDR, which can be, for example, three bits long, is dynamically assigned and de-assigned and is unique only within a single piconet. The master uses the AM_ADDR when polling a slave in a piconet. However, when the slave, triggered by a packet from the master addressed with the slave's AM_ADDR, transmits a packet to the master, it includes its own AM_ADDR (not the master's) in the packet header.

Since ad hoc networks are dynamic, ad hoc networking technology typically has a neighbor discovery feature. The neighbor discovery feature allows one Bluetooth unit to find any other Bluetooth unit which the first Bluetooth unit can communicate with and consequently form an ad hoc network with. A neighbor discovery procedure in Bluetooth is known as the INQUIRY procedure. Once a Bluetooth unit knows of neighboring Bluetooth units, a Bluetooth unit can connect to the neighboring Bluetooth unit using the PAGE procedure.

Figure 4:
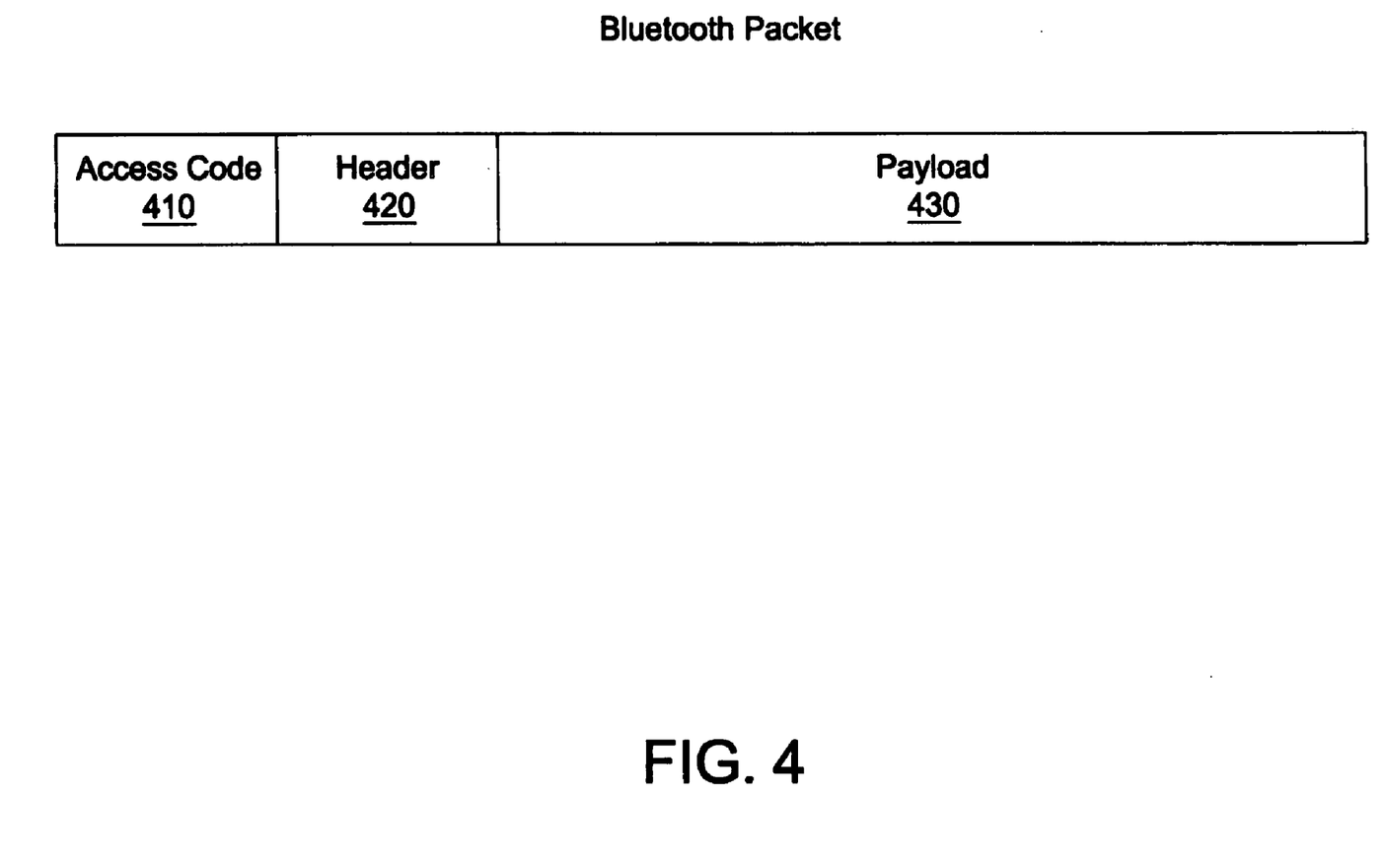
FIG. 4 illustrates an INQUIRY message packet.

FIG. 4 illustrates a Bluetooth packet which is used for transmitting information, for example within the topologies of FIGS. 1–3. The illustrated Bluetooth packet consists of access code 410, header 420 and payload 430. The header 420 contains the AM_ADDR followed by some control parameters, e.g., a bit indicating acknowledgment or retransmission request of the previous packet, when applicable, and a header error check (HEC). The access code 410 in the packet can be of three different types including a channel access code (CAC), a device access code (DAC) or an inquiry access code (IAC).

The channel access code identifies a channel that is used in a particular piconet, i.e., in essence the channel access code identifies the piconet. Accordingly, all packets exchanged within a piconet carry the same channel access code. The channel access code is derived from the BD_ADDR of the master unit of the piconet. The device access code is derived from a BD_ADDR of a particular Bluetooth device. The device access code is used for special signaling procedures, e.g., the PAGE procedure, as will be described below. There are two types of inquiry access codes, the general inquiry access code (GIAC) and the dedicated inquiry access code (DIAC). The general inquiry access code (GIAC), is sent to discover any Bluetooth units in the vicinity. The dedicated inquiry access code (DIAC), is sent to discover only certain types of Bluetooth units. Each individual dedicated inquiry access code is unique to a different type of Bluetooth unit. Both the general inquiry access code and the dedicated inquiry access code are used in the INQUIRY procedure.

Figure 5:
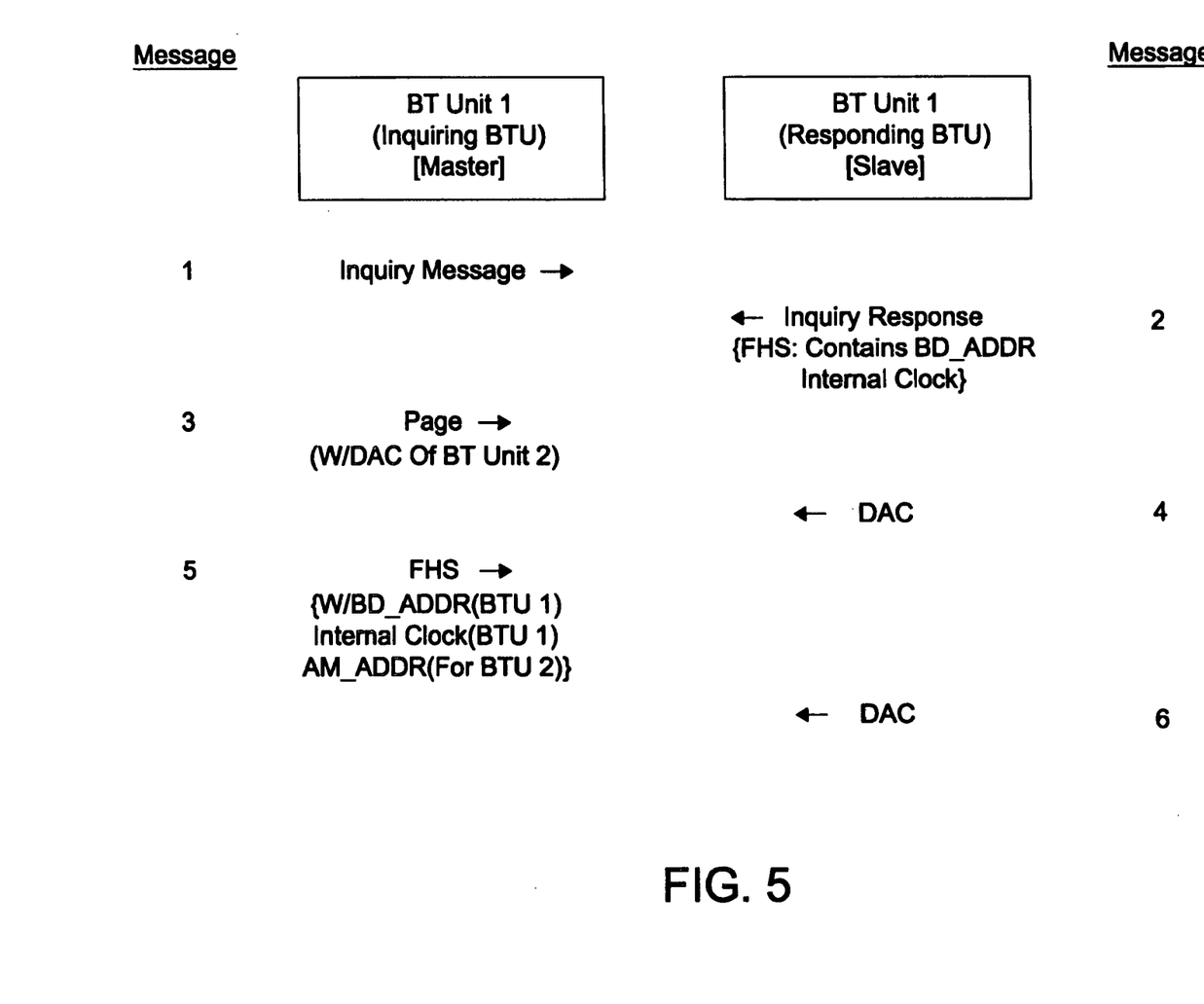
FIG. 5 illustrates the signaling performed between two Bluetooth units for neighbor discovery and connection establishment.

FIG. 5 illustrates exemplary signaling performed between two Bluetooth units for neighbor discovery and connection establishment. Note that in FIG. 5, there are two column headings labeled "Message." These columns are intended to indicate the relative sequencing of transmissions between Bluetooth devices. A Bluetooth unit 1 wishing to discover neighboring Bluetooth units broadcasts an INQUIRY message. A Bluetooth unit issuing an INQUIRY message is referred to herein as the "initiator". The initiator then waits and listens for INQUIRY RESPONSE messages. An INQUIRY message consists of only an inquiry access code, i.e. either a GIAC or DIAC. The INQUIRY message will be sent repeatedly according to specified timing and frequency sequences, e.g., those found in the published "Core Specification of the Bluetooth System", v1.0A, Jul. 26, 1999, the disclosure of which is incorporated here by reference.

Figure 6:
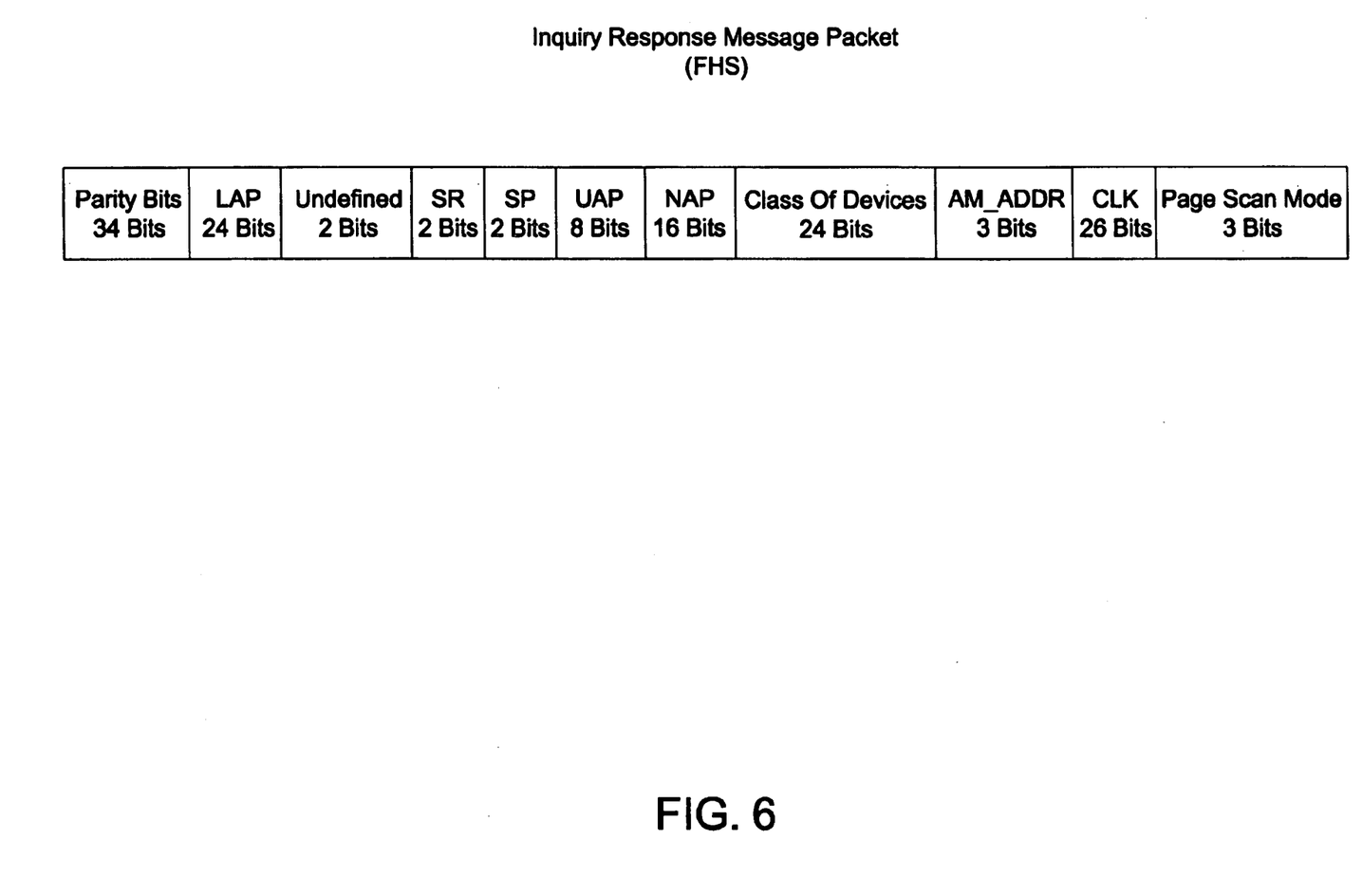
FIG. 6 illustrates an INQUIRY RESPONSE message packet.

When a neighboring Bluetooth unit, such as Bluetooth unit 2, receives an INQUIRY message directed thereto (i.e., either an INQUIRY message with a GIAC or a DIAC associated with that device's type or class), Bluetooth unit 2 responds with an INQUIRY RESPONSE message. The INQUIRY RESPONSE message is transmitted as a frequency hop synchronization (FHS) packet. FIG. 6 illustrates an exemplary frequency hop synchronization packet. All fields in the FHS packet, except the AM_ADDR field (and the undefined field) indicate properties or parameters of the Bluetooth unit that sends the FHS packet. The FHS packet includes fields for parity bits, lower address part (LAP), scan repetition (SR), scan period (SP), upper address part (UAP), non-significant address part (NAP), Class of Device, AM_ADDR, internal value of the sending unit's clock (CLK), and Page Scan Mode. The LAP, UAP and NAP together comprise the BD_ADDR of the responding unit.

The Class of Device field indicates the class of device of the responding Bluetooth unit. For example, a class of device might be a fax machine, phone, printer, or refrigerator. The CLK field contains the current value of the responding Bluetooth unit's internal clock. The SR, SP and Page Scan Mode fields are control parameters used during the PAGE procedure. The AM_ADDR field can be used to assign an AM_ADDR to a Bluetooth unit which is becoming a slave in a piconet (i.e. the AM_ADDR is only used when the FHS packet is used in the PAGE procedure) and the undefined field is reserved for future use.

Referring again to FIG. 5, when a Bluetooth unit desires to establish a connection with a neighboring Bluetooth unit, the Bluetooth unit sends a PAGE message. Messages 3 through 6 constitute the connection procedure, or PAGE procedure. A PAGE message (message 3) consists of the Device Access Code (DAC), derived from the BD_ADDR of the paged Bluetooth unit. A Bluetooth unit, e.g., Bluetooth unit 2, receiving a PAGE message including its own DAC responds with an identical packet, i.e., a packet including only the DAC (message 4) of the paged Bluetooth unit (Bluetooth unit 2). The paging Bluetooth unit, i.e., Bluetooth unit 1, then replies with an FHS packet (message 5), including the BD_ADDR of the paging Bluetooth unit (Bluetooth unit 1), the current value of the internal clock of the paging Bluetooth unit (Bluetooth unit 1), the AM_ADDR assigned to the paged Bluetooth unit (Bluetooth unit 2) and other parameters. The paged Bluetooth unit (Bluetooth unit 2) then responds with its DAC (message 6) thereby establishing a connection between the two Bluetooth units. If the paging Bluetooth unit already was the master of a piconet, the paged Bluetooth unit has now joined this piconet as a new slave unit. Otherwise, the two Bluetooth units have just formed a new piconet with the paging Bluetooth unit as the master unit.

Even though existing Bluetooth specifications describe the mechanisms that can be used to create piconets and form scatternets, the criteria used to determine which connections are actually formed to create a specific piconet or scatternet are not specified. For example, when multiple neighbors are discovered which offer a particular service desired by a user of a Bluetooth unit, there is no specified mechanism to determine which of the neighbors to connect to in order to form an appropriate piconet. Indeed, as mentioned above, the mechanism mentioned in the standard is to present the user with the neighbors identified via the INQUIRY procedure and require that the user manually select the neighbor to which connection shall be made.

Figure 7:
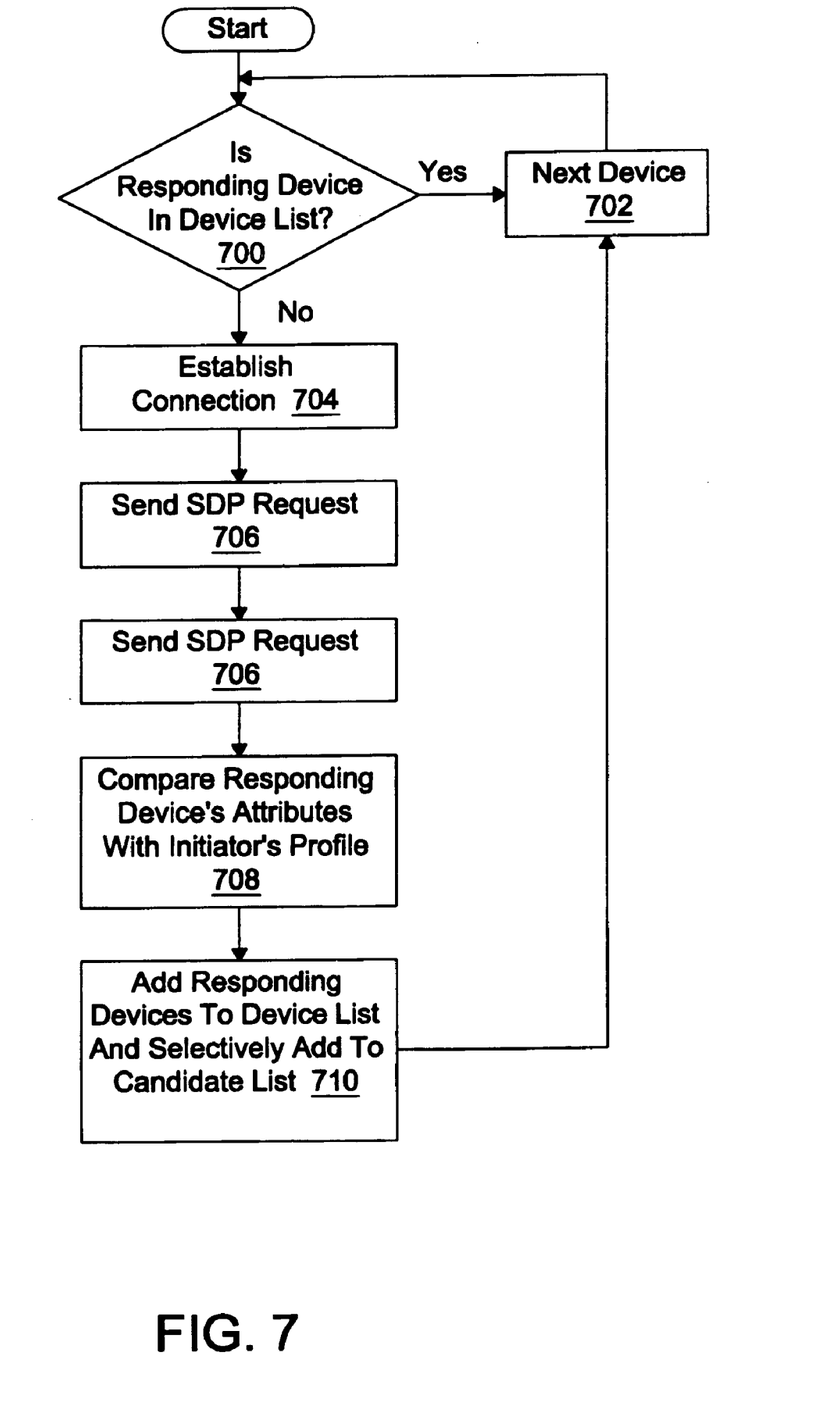
FIG. 7 is a flowchart illustrating exemplary steps for maintaining device lists according to an exemplary embodiment of the present invention.

According to exemplary embodiments of the present invention, neighbor selection and connection is performed by identifying and evaluating neighboring Bluetooth units within range and creating a candidate list from which a neighboring Bluetooth unit can be selected for connection. More specifically, as mentioned above, the initiator regularly performs an INQUIRY procedure with the class of device field in the INQUIRY message having a value that is set to the appropriate class for the service desired by the initiator. This procedure results in a list of all Bluetooth devices of the relevant class within range of the initiator. An exemplary method for managing Bluetooth device lists according to the present invention is depicted in FIG. 7. Since this is an ongoing process, for each responding Bluetooth device it can first be determined whether that device is already in the device list stored in memory (not shown) of the initiator at step 700. If this particular device is in the initiator's list, then the process can terminate with respect to that device as it has already been evaluated and ranked with respect to the desired service. Thus the flow will loop through block 702 to evaluate the next responding Bluetooth device.

If, however, the responding Bluetooth device is not found in the initiator's device list, then the flow proceeds to block 704 wherein a connection is made to that device, and an SDP request is sent to that device (step 706). The details of SDP messaging per se are specified in the above-incorporated standards specification and, therefore, are not repeated here. However, according to this exemplary embodiment, the SDP request asks that the responding device return further information, i.e., its values for attributes from the initiator's profile for the desired service, which profile is also stored in memory. These service profiles are described in more detail below. At step 708, the values of the attributes in the SDP response from the Bluetooth device are then compared with the profile to see if this device is a candidate, e.g., by determining how well the responding Bluetooth device's attributes match the initiator's service profile. If the responding device is identified as a candidate, then this responding device will be inserted into a candidate list at step 710 (also stored in the initiator's memory) based on how well it fulfils the criteria in the profile. Regardless of whether the responding device is added to the candidate list, it will be added to the device list so that this part of the process is not repeated for that device upon the next INQUIRY message being transmitted by the initiator.

As mentioned above, the candidate list is built by comparing the responding devices' relevant attributes with those in the initiator's service profile(s) of interest. The criteria used in the profile which define a "best" service for the user could be of two different kinds. For example, the criteria could indicate a relative preference between different values for a particular attribute (e.g. "colour is better than black and white, but black and white is OK" or "the higher the bandwidth provided by the connection the better"). Alternatively, the profile criteria could provide a specific minimum value for an attribute that must be fulfilled in order for a responding device to qualify for entry into the candidate list (e.g. "only colour", or "only bandwidth higher than x"). The service profile can be generated based on a combination of several attributes.

Thus, according to exemplary embodiments of the present invention, the initiator maintains two lists associated with discovered Bluetooth devices. Specifically, one unordered list which tracks discovered Bluetooth devices (the device list) and one ordered list of candidate devices (the candidate list), which list is ordered based on how well they match the initiator's service profile. Each entry in the device list can include, for example, the following information: the hardware address of the Bluetooth device (used as identifier of the device and to establish a connection thereto), any other information needed to establish a connection and whether the device is a candidate or not. Each entry in the candidate list can include the following information: the hardware address of the candidate Bluetooth device, how well it matches the relevant service profile and whether this Bluetooth device is the servicing device, i.e., the device to which the initiator is currently connected to provide a particular service.

The candidate which is the first on the list, i.e., the "best" candidate, can be used for that service, but only when that service is needed. Those skilled in the art will appreciate that this selection process can be run in the background by the initiator even if the service is not currently desired. In this way, when an application running on the initiator's device requests that service, the list of candidates is established and access to a service is faster.

Since the initiator is operating in a changing, ad hoc environment, it is anticipated that the device and candidate lists will be changing. For example, if a newly identified candidate is better than the current servicing device, it will be placed first in the list, and used as the new servicing device. Additionally, if the initiator detects a link failure to the servicing device, it can try to connect to that device again. If that fails, this device is removed from the candidate list and the device list, thereby forcing a change to a new servicing device.

Additionally, it may be the case that a device has moved out of range or been turned off since it was discovered. This could result in a scenario wherein a candidate is not available when the initiator wishes to connect thereto as the new servicing device. In that case this device can be removed from both lists, and the next candidate in the list can be tried until a connection is successfully made.

Figure 8A:
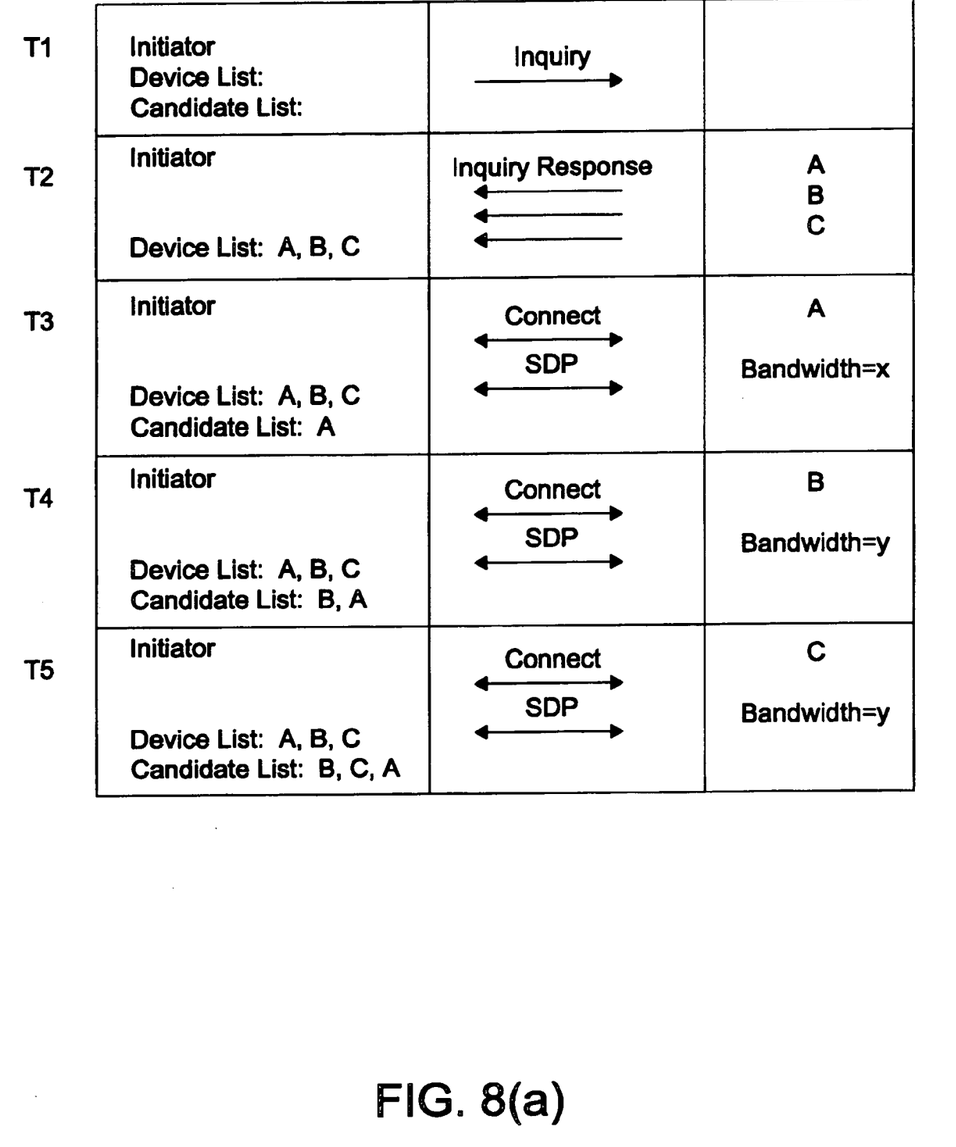
FIGS. 8(a) and 8(b) depict signalling for a search process according to an exemplary embodiment of the present invention.
Figure 8B:
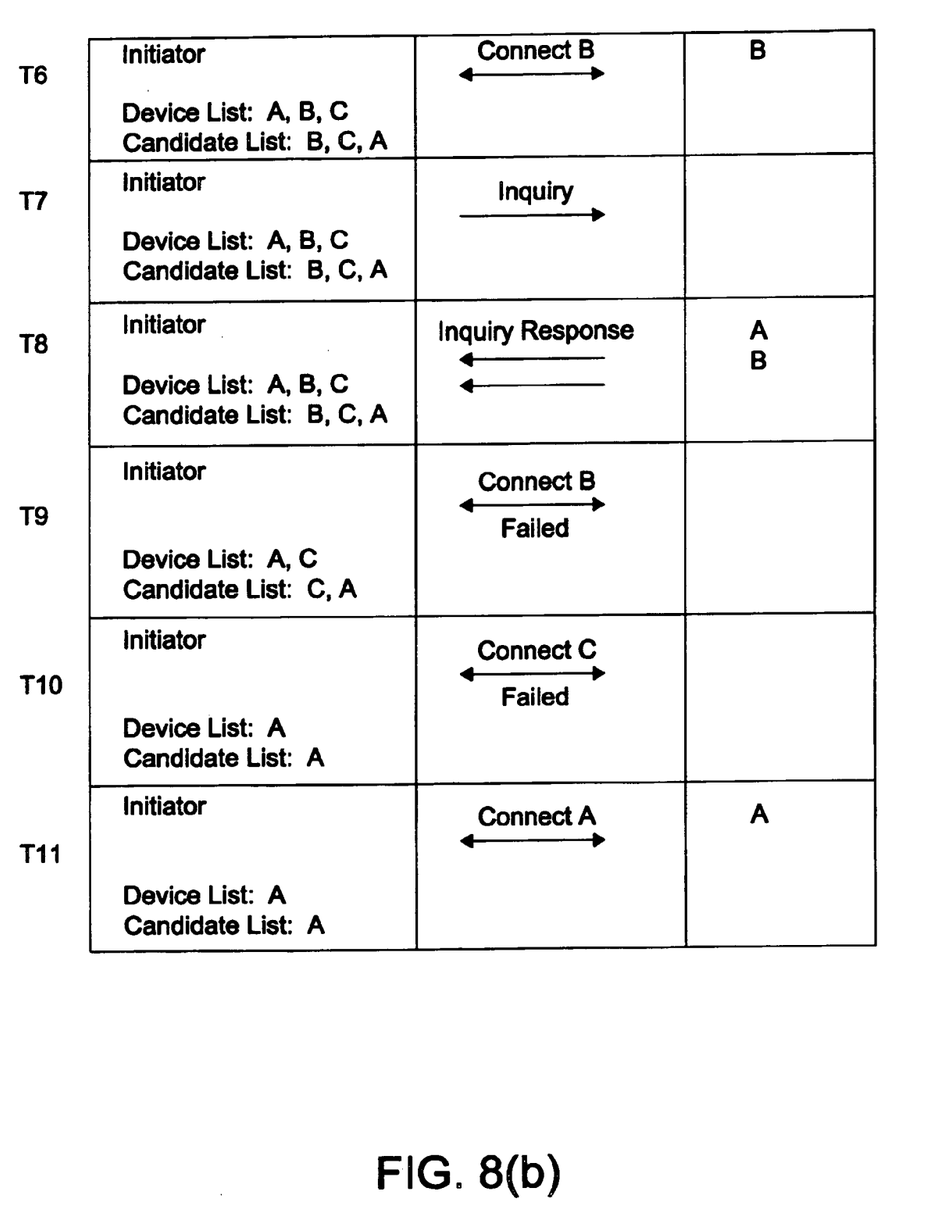

To further understand these various aspects of the present invention, consider the following example which follows the signalling diagram depicted in FIGS. 8(*a*) and 8(*b*). Consider, for the purposes of this example, that a Bluetooth enabled PDA is configured to provide, as one of its programmed service access options, Internet access. For this example, the user has entered a service profile which is simply "the higher the bandwidth, the better". Also assume for this example that three devices in within range of this Bluetooth enabled PDA offer Internet access. Specifically, device A is a Bluetooth enabled mobile phone, which offers a low bandwidth connection of x kbps. Devices B and C are Bluetooth access points connected to a fixed infrastructure which offer a higher bandwidth of y kbps. When the PDA is turned on, the search for best access starts in the background with devices A, B and C within range.

Thus, at T1 in FIG. 8(*a*), the PDA (acting as the initiator) sends out an INQUIRY message and has an empty device and candidate list. At T2, the initiator has received INQUIRY RESPONSES from the devices within its range that offer the desired service, in this example Internet access. Thus the device list now contains information associated with devices A, B and C. Next, at T3, the initiator connects to device A to learn more about its Internet service offering via SDP messaging. Device A is added to the candidate list since there is no minimum bandwidth criterion in the service profile. At T4 and T5, the PDA also interrogates devices B and C, respectively, to learn about their Internet access characteristics, in this example bandwidth. Thus, at T5, the candidate list places devices B and C ahead of device A since they offer higher bandwidth Internet connections.

Through point T5 in this example, the operation has occurred in the background since Internet access had not been requested by the PDA's user. However, at T6 (FIG. 8(*b*)), the user of the PDA decides that he or she actually wants to access the Internet, at which time the PDA connects to device B since that device is listed first in the candidate list. While the PDA is connected to the Internet, the evaluation of potential service providers continues as a background activity. Thus, at T7, the PDA transmits another INQUIRY message. During the time between the two INQUIRY messages, the PDA has moved out of range of device C. Therefore, at T8, the PDA receives INQUIRY RESPONSE messages from only devices A and B. Next, at T9, the PDA moves out of range of device B and, accordingly, tries to reconnect thereto. Failing to reconnect to device B, the initiator removes device B from both its candidate and device list and tries to connect to the next device in the candidate list, i.e., device C at T10. Since the PDA has also moved out of range of device C, this attempt at connection also fails leading to the connection to device A at T11.

Various modifications and adaptations to these concepts can be adopted. For example, the number of stale entries in the candidate list can be minimized if a counter is added to each entry in the device list. When a device is first discovered and placed in the device list, this counter is set to a predetermined value x. Each time an INQUIRY is made, and this device does not answer, the counter is decremented. Each time an INQUIRY is made, and the device answers, the counter is reset to x again. When the counter reaches zero, this means that the device has missed x number of sequential inquiries. It can then be assumed that the device is no longer viable for connection with the initiator and this device is removed from the device list and the candidate list (if it was a candidate). Since maintenance of the device list is intended to avoid having to send SDP requests to the same devices multiple times, removal of a device from the list creates the downside potential that, if that device appears again, a new SDP request has to be made. Thus, the counter value can be selected as desired to balance the tradeoff between keeping the device list manageably short without having to frequently replicate SDP requests for Bluetooth devices that move on and off the device list. To further optimize this tradeoff, devices that are known to be used often can be specially marked to be kept in the list even if they don't answer inquiries.

If the service profile is changed, the candidate list can be emptied, and new SDP requests made to all devices in the device list, so that the attributes can be compared with the new profile and a new candidate list can be built. This step could be avoided if the device list also retains attributes and their values for each device within proximity of the initiator. In this case no SDP requests have to be made to build the new candidate list. Then a changed service profile only implies a dropped candidate list, which candidate list is thereafter built up by checking attributes in the device list. Such implementation alternatives can be selected depending upon whether SDP requests (using processing power/battery) or storing a lot of data in the device list is a limiting factor in the initiator device.

Although the present invention is intended to operate to identify devices in range of an initiating device to find the "best" service access, those devices that are "within range" may include devices which are physically out of the transmitting range of the initiator but are connected to a device which is in range of the initiator. Consider again the scatternet of FIG. 3. If an initiator comes into range of devices associated with piconet 6 and transmits thereto an INQUIRY message with a class of device parameter that is not available within piconet 6, such an INQUIRY message may be forwarded to the other piconets in the scatternet. If a device within the scatternet corresponds to the class of device parameter and can provide the desired service, such an indication can be forwarded back through the scatternet to piconet 6 for the transmission of an affirmative INQUIRY RESPONSE message. This process may be transparent to the initiator.

Additionally, the present invention can also be used in conjunction with selective network access techniques and systems as described in U.S. patent application Ser. No. 09/438,431, entitled "Method and Apparatus for Selective Network Access" filed on Nov. 12, 1999, the disclosure of which is incorporated here by reference. Therein, methods and apparatus for providing selective access to a network, for example by linking an end device to the network via an access network using a network terminating device are described. The end device may (or may not) have a direct interface usable for data and/or voice communications. The end device is equipped with an indirect interface and uses the indirect interface to determine the access capability for each access network which is available to the end device. The access capabilities may include, for example, cost of access, coverage area, available bandwidth, delay and QoS. The determined access capability for each access network can be compared with a preferred access capability associated with the end device, or user thereof, wherein a particular access network can be selected based on, for example, how favorably the determined access capabilities of each access network compare with the preferred capabilities of the end device or user. Accordingly the preferred capabilities may also include cost of access, coverage area, available bandwidth, delay and QoS and both the actual access network terminating device capabilities and the preferred capabilities may include other factors such as the network type and the like. Based on the comparison, one of the access network terminating devices may be selected and the end device may be configured according to the access capabilities of the selected access network terminating device prior to connecting to the selected access network.

The indirect interface may be also be used during the connection between the end device and the ultimate network to detect if new access network terminating devices are available to the end device. If new devices are detected, an access capability associated with each of the new access network terminating devices may be determined and a comparison may be made between the determined access capability associated with each new access network terminating device, the capabilities associated with the currently used access network terminating device and a preferred access capability associated with the end device. As in the previous embodiment, a decision to reselect among the available access network terminating devices is based on the comparison. If a better access for the end device is identified, the new access network terminating device is selected and the end device may be reconfigured according to the access capability associated with the selected new access network terminating device.

Those skilled in the art will appreciate that the foregoing techniques and structures can be implemented, for example, in a handheld device having a transmitter, a processor and a memory device, which components (and their programming) will be familiar to those skilled in the art. The transmitter, processor and memory device can, for example, be configured to operate using communication protocols such as those described in the above-incorporated by reference documents or other protocols.

Thus, it can be seen that these exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for selecting a device for a service connection with en initiating device comprising the steps of:
    transmitting an inquiry message requesting a response from devices which receive said inquiry message that are within a desired class;
    identifying proximate devices within said desired class based on responses to said inquiry message;
    querying said identified devices to obtain at least one attribute value associated with a particular service;
    comparing, for each said identified device, said at least one attribute value with a profile associated with said particular service;
    selecting one of said identified devices based on said comparing step;
    transmitting at least one subsequent inquiry message to the identified devices; and
    determining that an identified device is no longer proximate to the initiating device when the identified device fails to respond to a predetermined number of subsequent inquiry messages.

2. The method of claim 1, further comprising the step of:
    storing said profile in a memory of said initiator device.

3. The method of claim 1, wherein said devices are enabled for short range radio communication.

4. The method of claim 3, wherein said step of querying further comprises the step of:
    sending an SDP request to said identified devices.

5. The method of claim 1, further comprising the steps of:
  determining, prior to said querying step, whether an identified device is present in a device list stored in said initiating device; and
  selectively querying said identified device based on a result of said determining step.

6. The method of claim 5, wherein said device list includes for each device therein, at least one of:
  a hardware address of said device and an indication of whether said device is present in a candidate list.

7. The method of claim 6, wherein said device list further includes said at least one attribute value for each device listed therein.

8. The method of claim 1, further comprising the step of:
  selectively adding said identified devices to a candidate list based on a result of said comparing step.

9. The method of claim 1, wherein determining that an identified device is no longer proximate to the initiating device comprises the steps of:
  storing in a device list, a device which responds to said inquiry message;
  initializing a counter for said device;
  decrementing said counter if said device fails to respond to the at least one subsequent inquiry message; and
  removing said device from said device list if said counter reaches a predetermined value.

10. A method for selectively accessing a network device to provide a service comprising the step of:
  transmitting one or more inquiry messages to identify network devices that are proximate to an initiating device;
  maintaining a ranked candidate list of network devices identified as being proximate to the initiating device, which each have a matching value associated therewith based on a correspondence between a service profile of the initiating device and at least one corresponding attribute of said network device;
  selecting a highest ranked one of said network devices in said candidate list to provide said service; and
  periodically updating said candidate list to add a new network device when the new device responds to one of the inquiry messages and includes at least one attribute in correspondence with the service profile; and to remove an old network device when the old device fails to respond to a predetermined number of inquiry messages.

11. A device comprising:
  a transmitter for transmitting an inquiry message requesting a response from devices which receive said inquiry message that are within a desired class; and
  a processor for identifying proximate devices within said desired class based on responses to said inquiry message;
  wherein said transmitter sends another message querying said identified devices to obtain at least one attribute value associated with a particular service;
  wherein said processor compares, for each said identified device, said at least one attribute value with a profile associated with said particular service; and selects one of said identified devices based on said comparison for connecting said device thereto;
  wherein the transmitter sends at least one subsequent inquiry message to the identified devices; and
  wherein the processor determines that an identified device is no longer proximate to the initiating device when the identified device fails to respond to a predetermined number of subsequent inquiry messages.

12. The device of claim 11, further comprising:
  a memory unit for storing said profile.

13. The device of claim 11, wherein said transmitter is enabled for short range radio communication.

14. The device of claim 13, wherein said another message is an SDP request.

15. The device of claim 11, wherein said processor further performs the functions of:
  determining, prior to said querying step, whether an identified device is present in a device list stored in said device; and
  selectively querying said identified device based on a result of said determining step.

16. The device of claim 15, wherein said device list includes, for each device therein, at least one of:
  a hardware address of said device and an indication of whether said device is present in a candidate list.

17. The device of claim 16, wherein said device list further includes said at least one attribute value for each device listed therein.

18. The device of claim 11, wherein said processor further performs the function of:
  selectively adding said identified devices to a candidate list based on a result of said comparison.

19. The device of claim 11, further comprising:
  a counter for an associated device in said device list;
  wherein said processor decrements said counter if said associated device fails to respond to the at least one subsequent inquiry message; and
  wherein said processor removes said device from said device list if said counter reaches a predetermined value.

20. A method for selecting a device for a service connection with an initiating device comprising the steps of:
  transmitting an inquiry message requesting a response from devices which receive said inquiry message that are within a desired class;
  identifying proximate devices within said desired class based on responses to said inquiry message;
  querying said identified devices to obtain at least one attribute value associated with a particular service;
  comparing, for each said identified device, said at least one attribute value with a profile associated with said particular service;
  selecting one of said identified devices based on said comparing step;
  storing, in a device list, a device which responds to said inquiry message;
  initializing a counter for said device;
  decrementing said counter it said device fails to respond to a subsequent inquiry message; and
  removing said device from said device list if said counter reaches a predetermined value.

21. A device comprising:
  a transmitter for transmitting an inquiry message requesting a response from devices which receive said inquiry message that are within a desired class;
  a processor for identifying proximate devices within said desired class based on responses to said inquiry message; and
  a counter for an associated device in said device list;
  wherein said transmitter sends another message querying said identified devices to obtain at least one attribute value associated with a particular service;
  wherein said processor compares, for each said identified device, said at least one attribute value with a profile associated with said particular service; and selects one of said identified devices based on said comparison for connecting said device thereto;

wherein said processor decrements said counter if said associated device fails to respond to a subsequent inquiry message; and wherein said processor removes said device from said device list if said counter reaches a predetermined value.

* * * * *

UNITED STATES PATENT AND TRADEMARK OFFICE
CERTIFICATE OF CORRECTION

PATENT NO. : 7,164,885 B2  Page 1 of 1
APPLICATION NO. : 09/737950
DATED : January 16, 2007
INVENTOR(S) : Jonsson et al.

It is certified that error appears in the above-identified patent and that said Letters Patent is hereby corrected as shown below:

On the Title Page Item (75), under "Inventors", in Column 1, Line 3, delete "Solna (SE)" and insert -- Egham (UK) --, therefor.

In Column 10, Line 41, in Claim 1, delete "en" and insert -- an --, therefor.

In Column 10, Line 56, in Claim 1, delete "identifled" and insert -- identified --, therefor.

In Column 12, Line 50, in Claim 20, delete "it" and insert -- if --, therefor.

Signed and Sealed this

Eighth Day of April, 2008

JON W. DUDAS
*Director of the United States Patent and Trademark Office*